United States Patent Office 3,181,227
Patented May 4, 1965

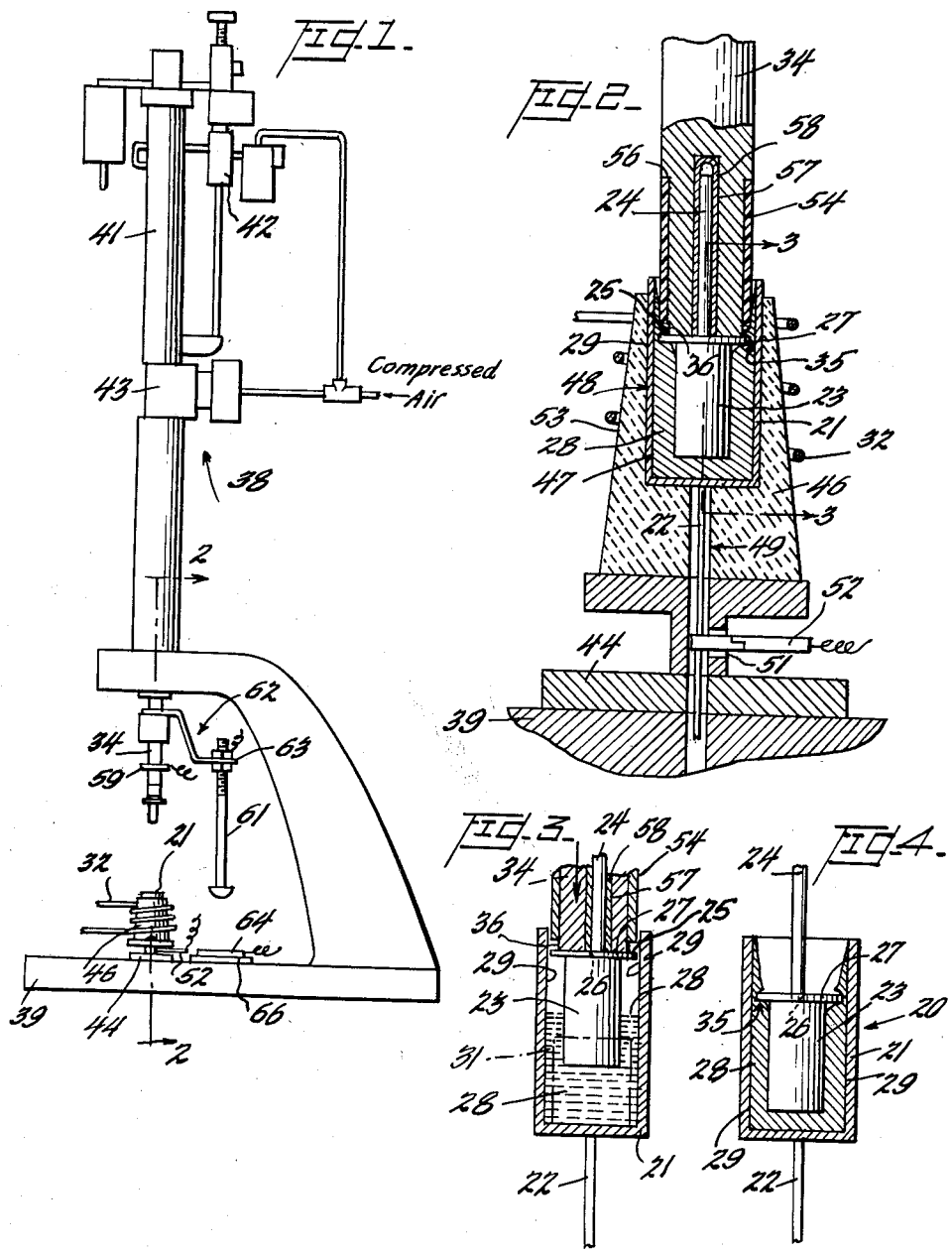

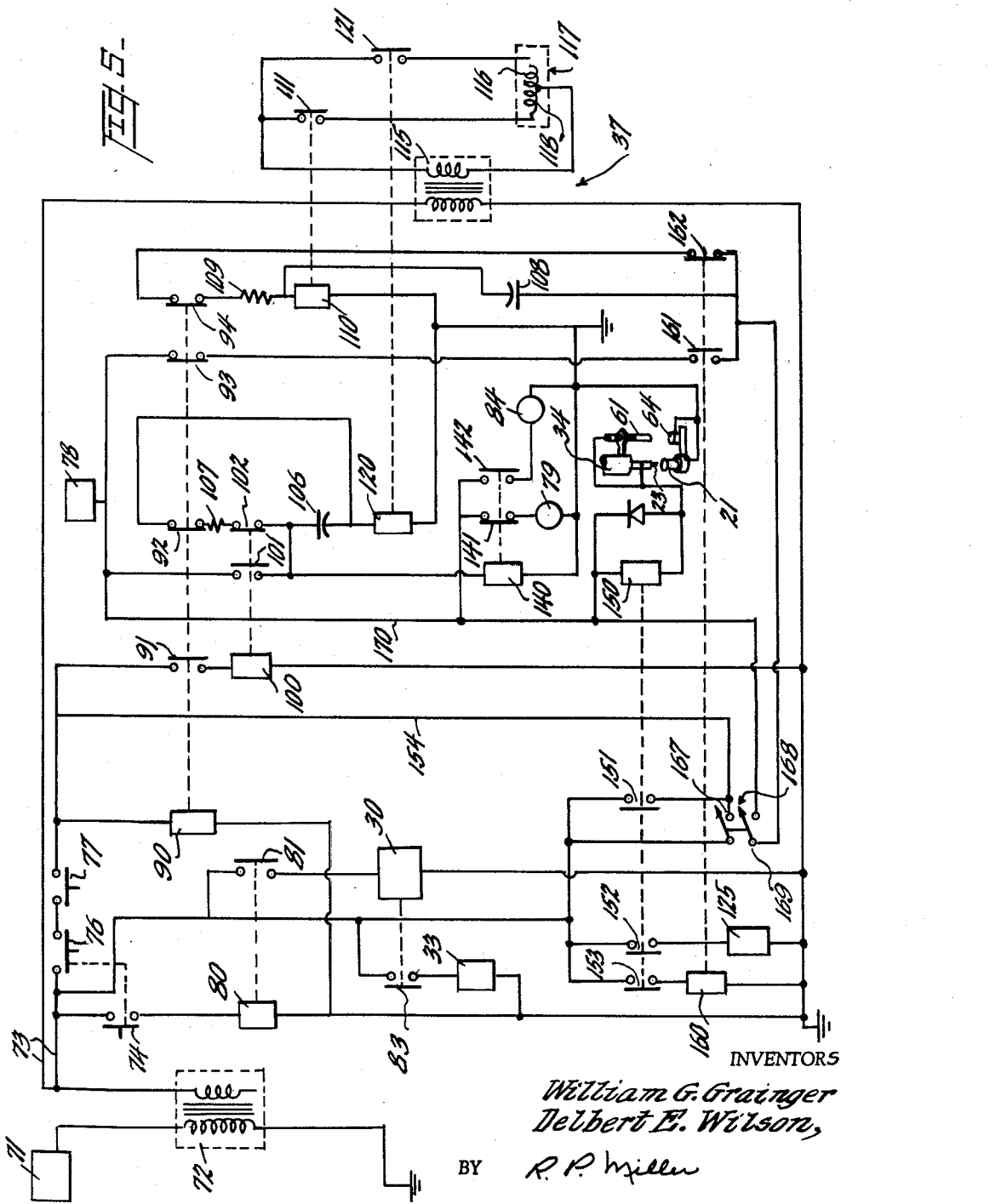

3,181,227
APPARATUS FOR ASSEMBLING COMPONENTS
William G. Grainger, Winston-Salem, N.C., and Delbert E. Wilson, Magna, Utah, assignors to Western Electric Company, Incorporated, New York, N.Y., a corporation of New York
Filed Dec. 11, 1961, Ser. No. 158,432
13 Claims. (Cl. 29—25.42)

This invention relates to apparatus for assembling components and more particularly to a device for controlling the depth of insertion of components into packages or containers.

In manufacturing operations, it is frequently necessary to package or enclose components by inserting them into containers. More particularly, in the manufacture of tantalum anode capacitors, it is necessary to insert the anode to a predetermined depth in a capacitor container so that a fusible substance, such as solder, can maintain the anode in a predetermined spaced relationship with the inner walls of the container. If fused solder is placed in the container prior to insertion of the anode, it is desirable to prevent the upper surface of the anode from being submerged beneath the surface of the solder because electrical contact between the container and a lead wire attached to the upper surface of the anode would prevent use of the device as a capacitor.

An object of this invention is to provide a new and improved apparatus for assembling a component.

Another object of this invention is to provide a facility that receives a lead wire that extends from a component and inserts the component in a container of electrically conductive substance but prevents electrical contact between the lead wire and the substance.

Still another object of this invention is the provision of a facility for inserting a component into a bath of electrically conductive liquid in conjunction with instrumentalities rendered effective upon a predetermined displacement of the path for interrupting operation of the facility.

A further object of the invention is the provision of an electrically conductive bath received in a container wherein the operation of a ram for advancing a component into the bath is interrupted upon contact of a displaced portion of the bath with the ram.

A still further object of this invention is to provide an electrical control circuit connected between a press ram and a container mounted on a press bed wherein the circuit is completed by a conductive liquid being displaced and contacting the ram upon insertion of a component to a predetermined depth within the container.

With these and other objects in view, the present invention contemplates an assembly device for inserting an electrical component to a certain depth within a container. A solder pellet is first placed within the container whereupon a heater is energized for melting the solder pellet to form a solder bath in the container. A metallic, electrically conductive ram is provided for advancing the component into the container to displace a portion of the bath. The bath is displaced upwardly into contact with the ram for completing a control circuit which interrupts operation of the ram.

Other objects and advantages of the present invention will become apparent from the following detailed description when considered in conjunction with the accompanying drawings wherein:

FIG. 1 is an elevational view of a ram for carrying and advancing a component into a container according to the principles of the invention;

FIG. 2 is a cross-sectional view taken on lines 2—2 of FIG. 1 showing a solder pellet melted by a heater and displaced into contact with the ram upon advancement of the component into the container;

FIG. 3 is a cross-sectional view taken on lines 3—3 of FIG. 2 showing the initial downward movement of the ram toward the container wherein the component has commenced displacing the molten solder upwardly;

FIG. 4 is a cross-sectional view of a partially assembled tantalum anode capacitor showing the anode or component supported within the container by the solidified solder; and FIG. 5 is an electrical schematic diagram of a control circuit that is rendered effective upon displacement of the molten solder into contact with the ram for interrupting downward advancement of the ram.

Referring in general to FIG. 4, the elements of a device, such as a tantalum capacitor 20, which may be manufactured according to the principles of the invention, are shown. The capacitor 20 includes a hollow cylindrical capacitor container or can 21 which is provided with a lead wire 22 depending therefrom. A dielectric surface of tantalum oxide is formed on a sintered tantalum anode 23. The anode 23 is provided with a lead wire 24 that extends upwardly from the upper surface thereof. The anode lead wire 24 is forced through an aperture 26 provided in a ceramic insulating disc or washer 27. The disc 27 has a diameter which exceeds the diameter of the anode. The insulating disc 27 is suitably fixed or sealed to the upper surface of the anode 23.

The anode 23 and the container are assembled to partially complete the fabrication of the capacitor 20 by means of a solidified mass of electroconductive fusible material, such as solder 28, which surrounds the anode 23 and the ceramic disc 27. The solder 28 supports the anode 23 at a predetermined position relative to the container walls 29. Further assembly operations for completing the capacitor 20 may include pouring a potting compound into the cavity formed by the container walls 29 and the disc 27.

Referring to FIG. 3, a preformed solder pellet 31 is shown (in dotted lines) placed within the container 21. The solder pellet 31 is fused upon energization of a heater coil 32 (see FIGS. 1 and 2). The tantalum anode 23 is then advanced downwardly by an electrically conductive, metal ram 34 and is inserted into the fused solder. The ram advances the anode 23 into the fused solder 28 so that a portion of the solder is displaced upwardly and reaches the level of the ceramic disc 27.

As shown in FIG. 2, the solder 28 squeezes through a space 35 between the disc 27 and the container walls 29 onto an annular exposed section 25 of the upper surface of the disc 27 and into contact with an annular section or exposed surface 36 of the ram. A control circuit 37 (see FIG. 5) is rendered effective upon the solder 28 contacting the surface 36 of the ram 34 for interrupting advancement of the ram, which then holds the anode 23 stationary in the solder 28. The solder solidifies and supports the anode 23 within the container. The ram 34 then reverses whereupon the solidified solder on the annular section 25 of the disc 27 holds the anode 23 fixed within the container 21.

It is to be noted while still referring to FIG. 2, that the fused solder 28 is precluded from touching the anode lead wire 24 during the assembly operation inasmuch as the disc 27 is fixed to the upper surface of the anode 23. Further, the lower surface of the ram 34 tightly engages the upper surface of the disc 27. Thus, during the assembly operation, the displaced fused solder 28 cannot contact the lead wire 24 and thus cannot cause a short-circuit between the container 21 and the lead wire 24 which would by-pass the anode and prevent use of the device 20 as a capacitor.

Attention is now directed to FIG. 1 where a press, generally indicated by the reference numeral 38, is shown including the ram 34 that is mounted for vertical reciprocation relative to a bed 39. Suitable facilities such as a pneumatic motor 41 and a pneumatic motor control valve 42 are provided for actuating the ram 34. A standard hydrocheck unit 43 is also provided for interrupting advancement of the ram 34 by opposing the action of the pneumatic motor 41 in a well-known manner.

Referring to FIG. 2, an insulator base 44 mounted on the bed 39 is shown supporting a ceramic workholder or fixture 46 that is provided with an aperture 47 for receiving and holding a capacitor container 21 with a snug fit. The capacitor container 21 is placed within a workholder section 48 of the aperture 47 so that the lead wire 22 extends downwardly through a smaller section 49 thereof and passes an aperture 51 formed in the side of the base 44. A clip, such as a standard alligator-type clip 52, may be extended through the aperture 51 and is fastened to the lead wire 22 for electrically connecting the capacitor container 21 to the control circuit 37 shown in FIG. 5. The heater coils 32 of an induction heater 33 (FIG. 5) surround the sloping outer walls 53 of the ceramic workholder 46 for fusing the solder pellet 31 that is placed within the capacitor container 21 during the assembly.

Attention is now directed to FIG. 2 where the lower end of the ram 34 is shown provided with an external insulating sleeve 54 that abuts a shoulder 56 formed in the ram. The outer diameter of the insulating sleeve 54 is approximately the same or slightly less than the internal diameter of the capacitor container 21 so that upon advancement of the insulating sleeve into the container, the sleeve engages and centers the ram 34 within the container. A resilient insulating tube 58 which is closed at one end is inserted into an axial aperture or slot 57 that is machined in the lower end of the ram 34. After the anode 23 and the ceramic disc 27 have been assembled, the anode lead wire 24 is inserted into the resilient tube 58. The tube 58 grips the lead wire with sufficient force to prevent the anode from falling out of the slot 57 by its own weight, while permitting the anode to be removed therefrom by the application of a small additional external force, such as the frictional forces between the container 21 and the fixture 46. The insulative tube 58, which may be made out of rubber, further precludes electrical contact between the anode lead wire 24 and the ram 34. When the anode lead wire 24 has been fully inserted into the tube 58, the ceramic disc 27 abuts the lower surface of the ram 34 and insulates the anode 23 from electrical contact with the ram. It may be appreciated that the lower portion of the ram 34 is enclosed by the insulating sleeve 54 and the ceramic disc 27 except for the annular exposed surface 36 between the insulating sleeve and the ceramic disc 27.

A second contact, or alligator-type clip 59, is mechanically attached to the ram 34 for electrically connecting the ram to the control circuit 37 shown in FIG. 5.

A probe or belt 61 of a ram overtravel or limit mechanism 62 is adjustably mounted to a supporting fixture 63 that is fixed to the ram 34. The probe 61 is advanced by the ram 34 into contact with a contact plate 64 that is mounted on an insulating member 66. The probe 61 and the contact plate 64 are each connected to the control circuit 37 for energizing the latter to interrupt downward advancement of the ram 34.

In the operation of the apparatus, the capacitor container 21 is inserted within the workholder section 48 of the aperture 47 and a solder pellet 31 of predetermined size is inserted within the container 21. The ceramic disc 27 is placed over the anode lead wire 24 and is sealed to the upper surface of the anode. The lead wire 24 is then inserted into and releasably gripped by the resilient insulative tube 58. The lead wire 24 is advanced in the tube until the ceramic disc 27 abuts the lowermost end of the ram so that the annular section 25 of the upper surface of the disc is exposed. The clips 52 and 59 are then respectively attached to the container lead wire 22 and the ram 34.

At this time, the control circuit 37 is operated for energizing the coil 32 of the induction heater 33 whereupon the solder pellet 31 fuses and forms a solder bath 28 in the container 21. The control circuit 37 is further effective at this time to actuate the pneumatic motor control valve 42 which actuates the pneumatic motor 41 for advancing the ram 34 downwardly. Downward advancement of the ram 34 inserts the anode 23 into the now fused solder bath 28 (see FIG. 3) whereupon a portion of the solder is displaced upwardly along the inner walls 29 of the container. As the anode 23 is further advanced downwardly, the ceramic disc 27 slides along the inner walls of the container to center the anode within the container 21. Further advancement of the ram moves the insulating sleeve 54 into sliding engagement with the inner walls 29 of the container 21 to prevent electrical contact between the ram and the walls of the container. Inasmuch as the exposed annular surface 36 of the ram has a smaller diameter than the internal diameter of the container, the ram neither electrically nor mechanically contacts the container.

Further downward advancement of the ram 34 displaces the solder 28 until a small portion of the solder is squeezed upwardly through the space 35 between the ceramic disc 27 and the walls 29 of the container 21. The solder advances through the space 35 onto the annular section 25 of the disc and into contact with the exposed annular surface 36 of the ram 34 (see FIG. 2). The solder 28 contacting the exposed surface 36 of the ram completes a circuit that may be traced from the control circuit 37, through the ram clip 59, through the ram 34, through the juncture of the ram surface 36 and the solder, through the solder 28, through the container 21, through the container lead wire 22, and through the container lead clip 52 to the control circuit 37 whereupon the control circuit is rendered effective to actuate the hydro-check unit 43. The hydro-check unit 43 then is effective to preclude further downward advancement of the ram 34.

As the ram 34 starts to advance the anode 23 into the container, the heater 33 is deenergized. Therefore, after the downward advancement of the ram 34 is interrupted and the anode 23 is held stationary in the solder 28 for a short interval, the solder cools and becomes sufficiently hardened to support and hold the anode 23 in the desired position within the container.

If a solder pellet 31 is undersized, the ram must advance the anode through an additional distance into the container to displace the solder into contact with the ram surface 36. The probe 61 of the limit mechanism 62 is adjusted relative to the fixture 63 to engage the contact plate 64 when the ram advances through the additional distance. A circuit is thereby completed for rendering the control circuit 37 effective to energize the hydro-check unit 43 which interrupts further downward advancement of the ram 34 to prevent the anode 23 from engaging the bottom of the container 21.

The control circuit 37 then actuates the pneumatic motor control valve 42 for reversing the ram 34. The anode lead wire 24 then slips out of the resilient tube 58 to permit the anode 23 to remain in the solidified solder 28 within the container 21.

Referring to FIG. 5, the electrical circuit 37 for controlling the press 38 is shown including a power supply 71 which energizes a transformer 72. A secondary line 73 of the transformer 72 is connected to a control switch 74, and series connected switches 76 and 77.

Prior to closing the switches 74, 76, and 77, the operator energizes a D.C. power supply 78 that supplies power through a normally closed contact 141 and through a "ready" indicating lamp 79, to ground. The operator then closes the switches 74, 76, and 77. Closure of the switch 74 completes a circuit that may be traced from the secondary line 73 through the now closed switch 74, through a relay 80, to ground. Energization of relay 80 draws up a contact 81 that completes a circuit that may be traced from the secondary line 73, through the now closed contact 81, and through a timer 30 to ground. Energization of the timer is effective to close a normally-open contact 83 for a predetermined interval even if the contact 81 is opened during that interval. Closure of the contact 83 completes a circuit that may be traced from the line 73, through the contact 83, and through the heater 33 to ground. Energization of the heater 33 commences melting the solder pellet 31 that has previously been placed in the capacitor container 21. The predetermined interval ends as the anode 23 is being inserted into the container 21, whereupon the contact 83 is released and opens to deenergize the heater 33.

Closure of the series-connected switches 76 and 77 completes a circuit that may be traced from the secondary line 73 and through a latching relay 90 to ground. Each time that the latching relay 90 is energized, the position of latching contacts 91 through 94 is reversed. The latching contacts remain in their reversed position when the relay 90 is deenergized and are not released and reversed until the relay is again energized. Energization of the latching relay 90 releases three normally-closed latching contacts 92, 93, and 94 and draws up and latches a normally-open latching contact 91.

Closure of contact 91 completes a circuit that may be traced from the secondary line 73 through the now closed contact 91 and through a time-delay relay 100 to ground. The relay 100 delays for a predetermined interval during which the heater 33 melts the solder, whereupon the relay is effective to draw up a normally open contact 101 and open a normally closed contact 102.

Closure of the contact 101 completes a circuit that may be traced from the D.C. power supply 78, through the now-closed contact 101, and through a parallel connection of first, capacitor 106, and a relay 120, and secondly, a relay 140, to ground. During the charging of capacitor 106, the relay 120 is energized and draws up a contact 121 to complete a circuit that may be traced through the secondary of a transformer 115, through the now-closed contact 121, and through a "RAM DOWN" coil 116 of a solenoid 117 to the transformer 115. Energization of the "RAM DOWN" coil 116 actuates the pneumatic motor control valve 42 which locks in position for supplying air pressure to the pneumatic motor 41 to move the ram 34 downwardly. When the capacitor 106 ceases charging, the relay 120 is deenergized and the contact 121 is opened. Because the control valve 42 is locked in position, the ram 34 continues to descend.

Simultaneously with closure of the contact 101 the relay 140 is energized and releases the contact 141 and draws up a normally open contact 142. Opening of the contact 141 extinguishes the "ready" lamp 79. Closure of the contact 142 completes a circuit from the power supply 78 through the contact 142, and through a "RAM ADVANCE" indicating lamp 84 to ground. The operator is thereby apprised that the ram 34 is about to descend and may then release and open the switches 74, 76, and 77. Opening of the switches 74, 76, and 77 opens the circuit to the relay 100 that may be traced from the line 73, through the now open switches 76 and 77, through the now closed contact 91 and through the relay 100 to ground. Deenergization of the relay 100 releases the normally open contact 101 and closes the normally closed contact 102. The capacitor 106 is thereby disconnected from the D.C. power supply 78. The capacitor 106 discharges through a resistor 107, and the closed contacts 102 and 92, and is thus conditioned for the next cycle of operation.

The ram 34 then inserts the anode 23 into the container 21 whereupon the timer 30 times out and opens the heater circuit to deenergize the heater 33. As the ram 34 advances further downwardly, the anode 23 is inserted into the molten solder 28. A portion of the solder 28 is displaced upwardly and is squeezed over the ceramic disc 27 into contact with the ram surface 36. When the solder 28 contacts the ram surface 36, a "RAM STOP" circuit is completed. The "RAM STOP" circuit may be traced from the D.C. power supply 78, through a relay 150, and through the molten solder connection between the ram surface 36 of ram 34 and the container 21 to ground.

Energization of the relay 150 draws up three normally open contacts 151, 152, and 153. Closure of the contact 151 completes a circuit that may be traced from the secondary line 73 through the now closed contact 151, over a conductor 154, and through the relay 90, to ground. Energization of the relay 90 draws up and closes the now open contacts 92, 93, and 94 and unlatches the contact 91 which returns to its normally open position. Thus, the relay 90 is reset when the contact 151 is closed.

Closure of the contact 152 completes a circuit that may be traced from the secondary line 73, through the now closed contact 152 and through a second solenoid 125 to ground. Energization of the solenoid 125 actuates the hydro-check unit 43 for interrupting downward advancement of the ram 34. Simultaneously therewith, closure of the contact 153 completes a circuit that may be traced from the secondary line 73, through the now closed contact 153 and through a time delay relay 160, to ground. At this time, the ram 34 is located and remains at the lowermost position for that particular insertion operation. During the time that the ram 34 remains down, the solder 28 hardens around the anode 23 to support and assemble the anode within the container 21 inasmuch as the heater coil 32 was deenergized when the anode 23 entered the container 21. After the solder solidifies sufficiently, the time delay relay 160 is effective to draw up a normally open contact 161 and release a normally closed contact 162.

Closure of the contact 161 completes a circuit that may be traced from the power supply 78 through the normally closed contact 93, through the now closed contact 161, through a capacitor 108, and through a relay 110, to ground. As the capacitor 108 charges, the relay 110 is energized and draws up a normally open contact 111. Closure of the contact 111 completes a circuit that may be traced from the secondary of the transformer 115, through the now closed contact 111, and through a "RAM UP" coil 118 of the solenoid 117. Energization of the "RAM UP" coil 118 reverses the pneumatic motor control valve 42 which locks in position for advancing the ram 34 upwardly. As the ram 34 advances upwardly, the anode 23 remains fixed and assembled in the container 21 and overcomes the releasable gripping force of the insulating tube 58 so that the tube slips off the lead wire 24. The circuit through the solder is thereby opened so that the relay 150 is deenergized.

Deenergization of the relay 150 releases the contacts 151, 152, and 153. The circuits through the relay 160 and the solenoid 125 are thereby opened for conditioning the apparatus for another cycle of operation. When the capacitor 108 is charged, the relay 110 is deenergized and releases the contact 111 which deenergizes the "RAM UP" coil 118. The pneumatic motor control valve 42, however, has locked in the "UP" position so that the ram 34 continues to advance upwardly.

Opening the circuit to the relay 160 causes the relay 160 to release the contact 162. The released contact 162 closes to complete a circuit that may be traced from the capacitor 108, through a resistor 109, through the contact 94, and through the contact 162. The capacitor 108 discharges through this circuit and is then conditioned for the next cycle of operation.

If the solder pellet 31 is too small for the configuration of the anode 23 and the container 21, the probe 61 engages the contact plate 64 as above-described. The probe 61 and the contact plate 64 are (FIG. 5) connected to the same part of the control circuit 37 as the ram 34 and the container 21 so that a circuit is completed through the relay 150 when the probe hits the plate. Upon energization of the relay 150, the apparatus is restored and conditioned for another cycle of operation in the manner described above.

An emergency stop circuit which may be controlled by the operator, is provided for interrupting the downward advancement of the ram. Upon ascertaining a dangerous or other condition which necessitates interrupting the downward advancement of the ram, the operator closes a double pole, single throw switch 168. Closure of the switch 168 completes a circuit that may be traced from the secondary line 73 through a first pole 167 of the switch 168 over the conductor 154 and through the relay 90 to ground. The relay 90 is thereby energized and reset as above-described.

Upon closure of the switch 168, an additional circuit may be traced from the power supply 78 over a conductor 170, through a second pole 169 of the switch 168, through the capacitor 108, and through the relay 110 to ground. As described above, as the capacitor 108 is charged, the relay 110 is energized and draws up the normally open contact 111 for energizing the "RAM UP" coil 118 of the solenoid 117. The ram 34 is thereby advanced upwardly to avoid the danger that prompted the operator to close the switch 167.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a device for inserting an electrically non-conductive article into an electrically conductive bath received in a container, electrically conductive means for advancing the article within the container to displace the conductive bath about the article into contact with the advancing means, and means rendered effective upon contact of the conductive bath with the advancing means for interrupting operation of the advancing means.

2. In a device for inserting a component into a liquid conductor received in a container, means for moving the component into the container to displace a predetermined portion of the liquid conductor, and means actuated by the displaced portion contacting the component moving means for interrupting operation of the component moving means.

3. In a device for assembling an insulating member within a can containing an electrically-conductive fluid, a ram constructed of electrically conductive material for receiving and holding said member, means for advancing the ram and the member into said container to displace the fluid around said member and into contact with the ram, and an electrical circuit completed by the fluid contacting said ram for interrupting said advancing means.

4. In an assembly device for inserting an electrical element into a can containing a solder pellet, heating means for fusing the pellet, electrically conducting means for advancing the element into the can to displace a portion of the fused solder upwardly over the element into contact with the advancing means, and electrical circuit means completed upon contact of the displaced solder with the advancing means for interrupting operation of the advancing means.

5. In a device for controlling the depth of insertion of a capacitor anode in a pool of solder received in a capacitor container, an insulated bed supporting the capacitor container, a ram for holding the capacitor anode, means for advancing the ram and the anode into the pool of solder to displace a portion of the solder into contact with the ram, a normally open circuit connected to the ram and to the container closed by contact with the ram of the solder displaced by the anode, and means actuated by the closed circuit for interrupting operation of the ram advancing means.

6. In a device for controlling the depth of advancement of a tantalum capacitor anode into a capacitor casing containing a solder pellet, a bed for supporting the casing, heating means for melting the solder pellet to form a solder bath, a ram having means for holding the anode, means for advancing the ram and the anode into the bath to displace a portion of the bath into contact with the ram, and electrical control circuit means closed by the displaced bath contacting the ram for interrupting operation of the ram advancing means.

7. In a device for assembling a component in a container receiving a pellet of solder, a support for the container, heater means for fusing the solder pellet, means for energizing the heater means for a first predetermined interval to fuse the solder whereafter the solder resolidifies, electrical means conducting for advancing the component into the container to displace a portion of said fused solder into contact with the advancing means, normally-open circuit means connected between the advancing means and the container and completed by the displaced solder contacting said advancing means, means operated by the completed circuit for interrupting operation of said advancing means, and means rendered effective after a second predetermined interval sufficient to allow resolidification of said fusible solder for reversing the advancing means.

8. In a device for assembling an insulated component in a cylindrical metal can containing liquid solder, a metal ram having a diameter less than the internal diameter of the can, a normally open electric circuit connected to the ram and the can for establishing an electric potential across the ram and the can, an insulating sleeve having an external diameter slightly less than the internal diameter of the can, said sleeve mounted on the ram so that an exposed section of the ram projects beyond the sleeve, an insulating member mounted on the ram for holding the component in abutment with the exposed section of the ram, ram advancing means for sliding the sleeve along the inner wall of the can to displace the solder around the component into contact with the exposed section of the ram and complete the normally open circuit, and means actuated by the completed circuit for interrupting operation of the ram advancing means.

9. In an apparatus for assembling a dielectric coated anode in a can, said anode having an insulating disc mounted on the top surface, a fixture for supporting said can with a pellet of solder therein, means for heating and melting the solder, a cylindrical ram having a diameter less than the diameter of said disc, means on said ram for holding said anode with the disc abutting and radially projecting beyond the ram, means for advancing said ram to insert said anode in the solder to displace said solder around said disc into contact with said ram, an electrical circuit completed by said solder contacting said ram, and means operated by the completion of said circuit for interrupting operation of said advancing means.

10. In an apparatus for assembling an insulator member in a melted bath of solder received in a container, means for maintaining the solder bath melted for a first predetermined time whereafter the solder solidifies, an electrically conductive ram having a holder for resiliently gripping the member, means for advancing the ram to submerge the member in the melted solder, an electrical circuit completed through said ram and solder, means operated by said completed circuit for maintaining the ram in its advanced position while the solder solidifies, means rendered effective after a second predetermined time sufficient to allow the solder to solidify for restoring the ram to the initial position leaving the member embedded in the solder, and means for holding the container against movement with the ram so that the resilient holder slips off the member.

11. In a press for assembling a component in a can containing a predetermined amount of liquid solder, a press ram for holding the component, a press bed, a workholder mounted on the bed for supporting the container, a contact plate mounted on the press bed, means for advancing the ram and the component a predetermined distance into the solder to displace the solder into contact with the ram, a circuit completed by the solder contacting the ram, means actuated by the completed circuit for interrupting operation of the advancing means, and a safety probe moved into contact with the contact plate by the ram moving through a distance greater than said predetermined distance for completing said circuit.

12. In an apparatus for assembling a container having a fused solder bath and a component provided with a lead wire that extends through a disc secured to the upper surface thereof; a cylindrical metal ram having a diameter less than the diameter of the disc; said ram provided with insulated means for resiliently gripping the lead wire to maintain the disc in abutment with the ram so that an annular surface of the disc projects radially beyond the ram; ram advancing means for submerging the component in the fused solder to displace solder onto the annular surface and into contact with the ram; a circuit completed through the container, the solder, and the ram; means operated by the completed circuit for maintaining the component and the disc submerged while the solder solidifies; means rendered effective after a predetermined time delay sufficient to allow solidification of the solder for retracting the ram leaving the component held in the container by the solidified solder on the annular surface, and means for preventing the container from moving with the ram so that the insulated means releases the lead wire.

13. In a device for inserting an electrically non-conducting component into an electrically conductive fusible material received in a container, heating means surrounding said container for maintaining said fusible maetrial in a liquid state, electrically conducting means for inserting the component into the container to displace the liquid upwardly about the component, said means having a longitudinal slot for releasably receiving and gripping the component, circuit means completed by the contact of said upwardly displaced liquid with the inserting means for interrupting the motion of said inserting means, means rendered effective after a first predetermined time for deactivating the heating means to allow solidification of said fusible material to grip the inserted component, and means rendered effective after a second predetermined time delay sufficient to allow solidification of said liquid for retracting the inserting means to release the component held in the longitudinal slot.

References Cited by the Examiner
UNITED STATES PATENTS

| | | | |
|---|---|---|---|
| 1,789,709 | 1/31 | Poole | 113—95 XR |
| 2,264,703 | 12/41 | Lenz | 113—126 |
| 2,619,063 | 11/52 | Anderson | 113—126 |
| 2,926,231 | 2/60 | McDowell | 219—85 XR |

CHARLES W. LANHAM, *Primary Examiner.*

JOHN F. CAMPBELL, *Examiner.*

UNITED STATES PATENT OFFICE
CERTIFICATE OF CORRECTION

Patent No. 3,181,227                                   May 4, 1965

William G. Grainger et al.

It is hereby certified that error appears in the above numbered patent requiring correction and that the said Letters Patent should read as corrected below.

Column 1, line 39, for "path" read -- bath --; column 6, line 12, for "'The" read -- The --; column 8, line 24, for "electrical means conducting" read -- electrically conducting means --.

Signed and sealed this 5th day of October 1965.

(SEAL)
Attest:

ERNEST W. SWIDER                            EDWARD J. BRENNER
Attesting Officer                             Commissioner of Patents